(No Model.) 2 Sheets—Sheet 2.
H. J. HAIGHT.
THERMOMETER OR THERMOSCOPE.
No. 356,761. Patented Feb. 1, 1887.
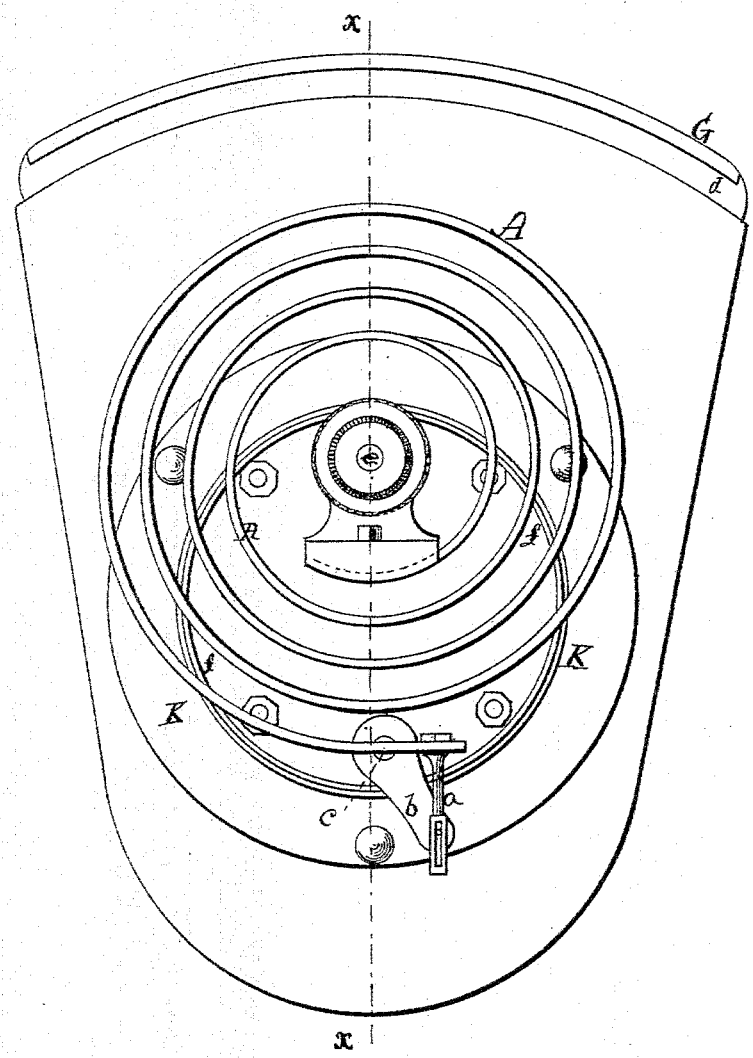
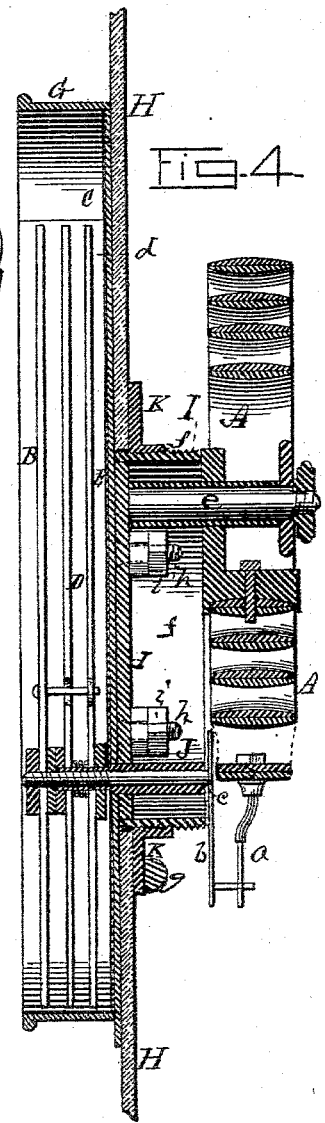

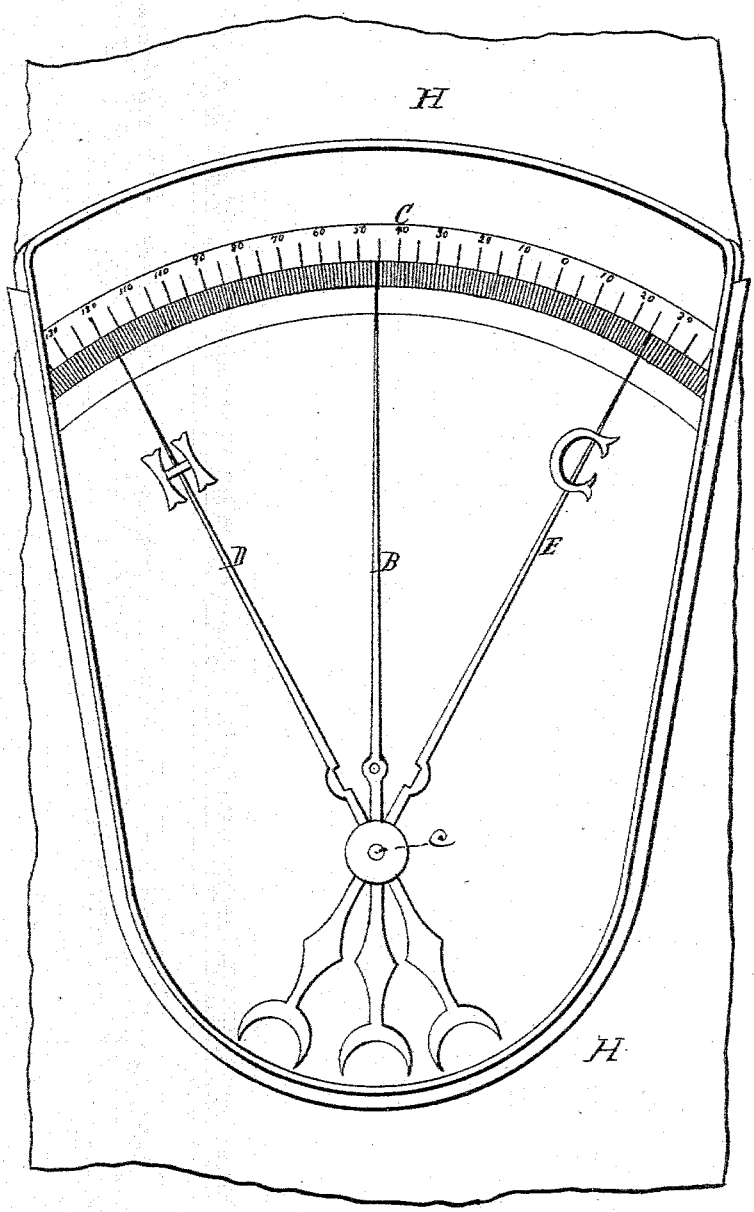

UNITED STATES PATENT OFFICE.

HENRY J. HAIGHT, OF NEW YORK, N. Y.

THERMOMETER OR THERMOSCOPE.

SPECIFICATION forming part of Letters Patent No. 356,761, dated February 1, 1887.

Application filed July 29, 1885. Serial No. 172,963. (No model.)

*To all whom it may concern:*

Be it known that I, HENRY J. HAIGHT, of the city, county, and State of New York, have invented an Improved Thermoscope; and I do hereby declare that the following is a full and exact description thereof, reference being had to the accompanying drawings, making part of this specification.

My present invention is especially applica10 ble to and intended for doors, windows, and thin walls or partitions by placing the thermometric coil on one side thereof and the indexes and scale on the other side of the same, so that the door or window is not required to be opened or a passage made to the other side of the wall or partition in order to observe the temperature on the other side.

The invention is especially applicable to refrigerators, refrigerator-cars, and ice-houses by attaching it to the doors thereof, to observe the temperature within without opening the same, or to the rooms of dwellings by attaching it to a window of the same, so that a person in the room may observe the outside tem25 perature without going out of doors or exposing one's self to the outer atmosphere or the weather.

In this invention I employ a thermometric coil, preferably such as described in Letters Patent granted to me August 5, 1884, No. 302,908; also, current temperature and high and low extreme-temperature indexes and scale similar to the corresponding parts in the said Letters Patent; but I do not confine my present invention to the construction therein shown.

In the accompanying drawings, Figure 1 represents the scale and index side of the thermoscope constructed and arranged according to my present invention; Fig. 2, a side edge view of the instrument; Fig. 3, the coil side of the instrument; and Fig. 4, a central vertical section of the instrument in a plane indicated by the line $x$ $x$, Fig. 3.

Like letters designate corresponding parts in all of the figures.

In the drawings, A represents the thermometric coil; B, the current-temperature index moved by the coil; C, the scale; D, the high-extreme temperature index, and E the low-ex50 treme temperature index.

The current-temperature index B is moved by the coil A through the arm $a$ on the movable end of the coil, coupled to the arm $b$ on one end of the shaft $c$, to which the index B is attached, all in a manner similar to the construction shown in the said Letters Patent. Instead of paper, milk-glass or other semi-transparent material may be used for this scale where the light may shine through.

The indexes and scale may be inclosed in a suitable case, G, of the form shown, or otherwise, and the case may have a glass cover or door to exclude dust, though I have shown none. I find it preferable, for the sake of economy and convenience, to print the scale C on a card or paper board, $d$, which is placed in the bottom of the case G, and is therefore removable and exchangeable with other scales at will.

Now, in order to apply this instrument to a glass pane or thin door-panel or partition, H, as shown in the drawings, so that the indexes and scale shall be on one side and the coil on the other side thereof, I employ a cap, I, on which the coil A is mounted by a projecting stud, $e$, as also a tubular bearing, J, in which the index-shaft $c$ turns. This cap has a cylindrical rim, $f$, of sufficient depth, and having a screw-thread cut on its outer periphery, as shown in Figs. 2 and 4. This cap, which is connected fixedly with the dial-plate or back of the case G, forming an extension thereof, by means of bolts or screws $h$ $h$, projecting from the back of the case through the cap and secured to the same by the nuts $i$ $i$, as shown in Fig. 4, or by other suitable means, is to be inserted through a round hole cut in the window-pane, door-panel, or partition, and is intended to extend through the same and project somewhat beyond on the other side thereof. Then upon the periphery of the cap a screw-threaded flanged nut, K, is screwed until it closely presses against that side of the pane, panel, or partition and draws the case G or dial-plate close up to the other side of the same. The flanged nut K is broad enough to furnish a sufficient flat surface to press against the pane, panel, or partition, as indicated in the drawings. A number of knobs or projections, $g$ $g$ $g$, (three, more or fewer,) are formed on or attached to the outer side of the flange to turn it by in screwing it on or off.

The instrument is easily and cheaply applied.

I claim as my invention—

The thermoscope constructed with the index-case G, cap I, attached to the back of the case and having a cylindrical rim, *f*, projecting backward therefrom, coil A, mounted on a stud, *e*, projecting from the cap inside of its rim, tubular bearing J for the index-shaft, mounted on the cap inside of the rim, and flanged nut K, screwing upon the said rim, screw-threaded for the purpose, the said cap-rim being adapted to extend through an aperture in a pane, panel, or partition, H, and to be fastened therein by the said nut, substantially as and for the purpose herein set forth.

HENRY J. HAIGHT.

Witnesses:
C. S. NEWELL,
H. V. D. HOYT.